United States Patent [19]
Umeya

[11] Patent Number: 5,244,427
[45] Date of Patent: Sep. 14, 1993

[54] METHOD OF PRODUCING AN ELECTRO-OPTICAL DEVICE

[75] Inventor: Shinjiro Umeya, Kanagawa, Japan
[73] Assignee: Sony Corporation, Tokyo, Japan
[21] Appl. No.: 837,971
[22] Filed: Feb. 20, 1992
[30] Foreign Application Priority Data
  Feb. 20, 1991 [JP] Japan .................. 3-047789
[51] Int. Cl.[5] .............................. H01J 9/24
[52] U.S. Cl. ......................... 445/24; 427/66
[58] Field of Search ............. 445/24, 25; 427/66
[56] References Cited

U.S. PATENT DOCUMENTS 4,235,001  11/1980  Matino ........................... 445/24
5,083,958  1/1992   Longo et al. ................. 445/24

FOREIGN PATENT DOCUMENTS 56-84848  7/1981  Japan ............................ 445/24

Primary Examiner—Mark Rosenbaum
Assistant Examiner—Jeffrey T. Knapp
Attorney, Agent, or Firm—Hill, Steadman & Simpson

[57] ABSTRACT

There is disclosed a method for producing an electro-optical device applied as image display device. This method comprises the steps of forming a plurality of channels on a major surface of a first substrate, each of the channels being substantially in parallel to each other; forming first electrodes in each channel; filling the channels with a material so as to flatten the major surface of the first substrate; depositing a dielectric layer on the flattened surface of the first substrate; removing the filled material from the channels; and combining the first substrate with second substrate, the second substrate having a plurality of second electrodes substantially perpendicular to the channels in an inner surface of the first substrate, and an electro-optical material layer interposed between the dielectric layer and the second substrate. An employment of this producing method results in no restriction in the thickness or dimension of a dielectric sheet, thus making it possible to provide an image display device free from the problem of unevenness in thickness thereof.

17 Claims, 3 Drawing Sheets

METHOD OF PRODUCING AN ELECTRO-OPTICAL DEVICE

BACKGROUND OF THE INVENTION

This invention relates to a method of producing an electro-optical device applied as an image display device to drive an electro-optical material layer by making use of plasma, thus to carry out selection of pixels.

As the means for allowing, e.g., a liquid crystal display to have high resolution and high contrast, there is generally carried out a method in which active elements such as transistors, etc. are provided for every display pixel, to drive them (which method is so called an active matrix addressing system).

In this case, however, since it is necessary to provide a large number of semiconductor elements such as thin film transistors, the problem of yield is apprehended particularly when the display area is enlarged, giving rise to the great problem that the cost is necessarily increased.

Thus, as the means for solving this, Buzaku et al. have proposed in the Japanese Laid Open Application No. 217396/89 publication a method utilizing discharge plasma in place of semiconductor elements such as MOS transistors or thin film transistors, etc. as an active element.

The configuration of an image display device for driving a liquid crystal by making use of discharge plasma will be briefly described.

This image display device is called a plasma addressed liquid crystal display device (PALC), and is of a structure in which, as shown in FIG. 7, a liquid crystal layer 101 serving as an electro-optical material layer and plasma chambers 102 are adjacently arranged through a thin dielectric sheet 103 comprised of glass, etc.

The plasma chambers 102 are constituted by forming a plurality of grooves 105 in parallel to each other in a glass substrate or base plate 104. Within these chambers, ionizable gas is filled. Accordingly, projecting portions 105a between respective grooves 105 perform a role as a partition wall partitioning the plasma chamber 102, and also perform a role as a gap spacer for each plasma chamber 102.

Further, pairs of electrodes 106 and 107 in parallel to each other are provided at respective grooves 105. These electrodes 106 and 107 function as an anode and a cathode for ionizing gas within the plasma chambers 102 to generate discharge plasma.

On the other hand, the liquid crystal layer 101 is held by the dielectric sheet 103 and a transparent substrate 108. On the surface at the liquid crystal layer 101 side of the transparent substrate 108, transparent electrodes 109 are formed. These transparent electrodes 109 are perpendicular to the plasma chambers constituted by the grooves 105. The portions where the transparent electrodes 109 and the plasma chambers 102 intersect with each other correspond to respective pixels.

In the above-mentioned image display device, by switching and scanning in sequence the plasma chambers 102 where plasma discharge is carried out, and applying signal voltages to the transparent electrodes 109 on the liquid crystal layer 101 side in synchronism with the switching scan operation, these signal voltages are held by respective pixels. The liquid crystal layer 101 is thus driven.

Accordingly, the grooves 105, i.e., plasma chambers 102 respectively correspond to one scanning lines, and the discharge region is divided every scanning unit.

Meanwhile, in an image display device utilizing discharge plasma as described above, it is considered that unenlarged display area is more easily realized than in an image display device using semiconductor elements. However, various problems are left in putting such an image display device into practice.

Particularly, when attention is drawn to the manufacturing thereof, many problems are involved in handling an extremely thin dielectric sheet (glass sheet), and the following problems further arise.

(1) A dielectric sheet of a thickness to such an extent used here (approximately 50 $\mu$m) has great unevenness in the thickness, resulting in unevenness in the characteristic. Further, it is very difficult to implement a post-processing for eliminating unevenness in the thickness.

(2) When attention is drawn to an electrical coupling between the electro-optical material layer and the discharge region, it is desirable that the dielectric sheet is as thin as possible, but it is difficult to prepare an extremely thin dielectric sheet in manufacturing.

(3) In the case of an extremely thin dielectric sheet, it is impossible to prepare a considerably large dielectric sheet because of the problem of strength, thus making it difficult to provide an enlarged display screen.

(4) In the case of sealing a dielectric sheet on a glass substrate provided with grooves, heat processing such as frit seal, etc. is required, giving rise to the problem of cracking or shrivelling, etc.

SUMMARY OF THE INVENTION

With the actual circumstances in view, this invention has been proposed, and its object is to provide a novel method for producing an electro-optical device applied to an image display device, which can solve all the above-described inconveniences.

A principal object of this invention is to provide a producing method in which it is unnecessary to handle a dielectric sheet as a single body, and there is no restriction in the thickness or dimension.

A further object of this invention is to provide a producing method in which unevenness in the thickness can be solved, and heat processing such as frit seal, etc. is not required.

To achieve the above-described objects, in accordance with this invention, there is provided a method for producing an electro-optical device comprising the steps of:

forming a plurality of channels on a major surface of a first substrate, the channels being substantially parallel to each other;

forming first electrodes in each channel;

filling the channels with a material so as to flatten the major surface of the first substrate;

depositing a dielectric layer on the flattened surface of the first substrate;

removing the filled material from the channels; and combining the first substrate with a second substrate, the second substrate having a plurality of second electrodes arranged substantially perpendicular to the channels in the major surface of the first substrate, and an electro-optical material layer interposed between the dielectric layer and the second substrate.

The above-mentioned material may be a material having heat-resisting property such as plastic material.

Further, the above-mentioned channels may be defined by partition walls formed on the first substrate.

In the producing method of this invention, the dielectric film preferably is directly formed on a substrate flattened by a heat-resisting high molecular material. Accordingly, difficulty in handling is eliminated. Further, by selecting a film forming technique, a large area and extremely thin dielectric film is formed, and unevenness in the film thickness is reduced.

On the other hand, since a heat-resisting high molecular material filled into grooves serving as plasma chambers is dissolved and removed, this material does not constitutes any obstacle. Namely, while the configuration of an image display device obtained is comparable in dimension to that of the conventional device, unevenness in the film thickness of the dielectric film can be eliminated. As a result, the characteristic is improved to such an extent that the film thickness can be thinner.

DESCRIPTION OF THE PREFERRED EMBODIMENT

An actual embodiment to which this invention is applied will now be described with reference to the attached drawings.

Figure 1:
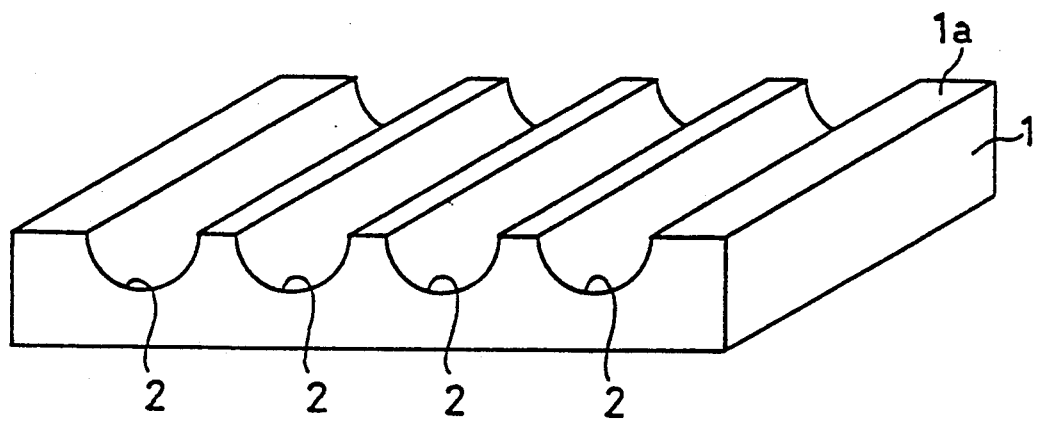
FIG. 1 is a schematic perspective view showing a groove forming process.
Figure 2:
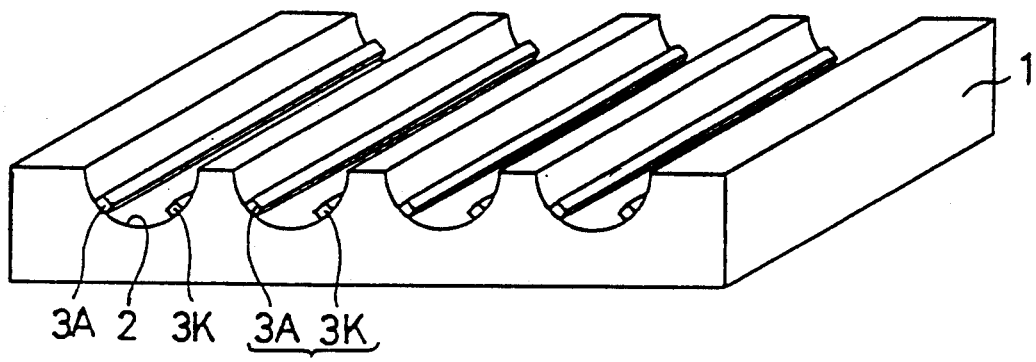
FIG. 2 is a schematic perspective view showing a discharge electrode forming process.

In order to manufacture an electro-optical device applied as an image display device, a plurality of grooves or channels 2 serving as a plasma chamber are first formed at one major surface 1a of a glass substrate 1 as shown in FIG. 1.

For the method of forming these grooves 2, such grooves may be formed by a mechanical grinding process, or by a chemical removal technique, e.g., etching, etc. Alternatively, both methods may be jointly used.

Further, while the groove 2 is substantially semi-circular in cross section, the shape thereof is not limited to this shape. Namely, the groove 2 may take an arbitrary shape, such as trapezoidal in cross section, or rectanglur in cross section, etc.

These grooves 2 correspond to respective scanning lines. Accordingly, a plurality of grooves 2 are formed in parallel to each other on the glass substrate 1 by a required number of scanning lines.

It is to be noted that while, in this embodiment, groove processing is directly implemented on the glass substrate 1 to form the grooves 2, depending on the circumstances parallel partition walls can be formed on the glass substrate 1 by a technique such as printing, etc., and spaces between these partition walls can serve as the grooves 2.

Then, belt-shaped discharge electrodes 3 extending in the same direction as an extending direction of the grooves 2 are formed within the respective grooves 2.

Each discharge electrode 3 is comprised of a pair of an anode 3A and a cathode 3K. A discharge electrode 3 serves to ionize a gas filled into the grooves 2 by discharge between the anode 3A and the cathode 3K. Accordingly, the distance between the anode electrode 3A and the cathode electrode 3K is set in consideration of the kind or the pressure of a gas filled into the grooves 2, and the depth of the groove 2, etc.

The discharge electrode 3 is formed, e.g., by forming a metal film on the entire surface of the glass substrate 1 including the grooves 2 formed therein by a technique such as plating or vacuum deposition to apply etching thereto. Alternatively, there may be employed a method of printing a glass paste in which fine particles of a conductive material such as Ni or Ag, etc. are mixed to apply heat hardening process thereto.

Figure 3:
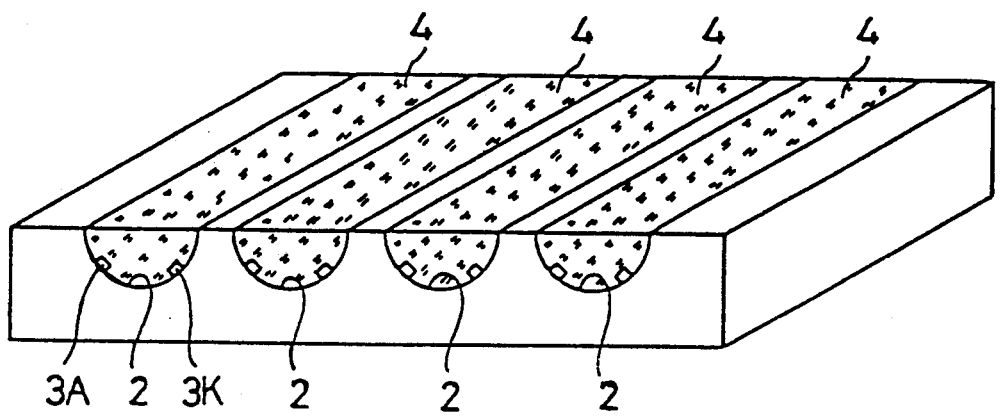
FIG. 3 is a schematic perspective view showing a heat-resisting high molecular filling process.

After grooves 2 and discharge electrodes 3 are formed at the glass substrate 1 in a manner stated above, the grooves 2 are filed with a heat-resisting high molecular material 4 as shown in FIG. 3, thereby allowing the glass substrate to be in a flat state. In this regard the grooves 2 are subjected to back filling by the heat resisting high molecular material 4.

As the heat-resisting high molecular material 4, plastic material or synthetic resin such as polyimide, etc. is used. For example, polyamic acid in a liquid form may be filled into the grooves 2 to apply heat hardening process thereto. It is to be noted that the reason why heat-resisting high molecular material 4 is used as the material to be filled in this embodiment is that is serve to prevent fusion or deformation, etc. due to heat when a dielectric film forming process is carried out by a technique such as vacuum deposition, etc. Accordingly, when no heat is applied in forming a dielectric film, e.g., in the case of implementation by coating, etc., the material to be filled is not necessarily required to be a heat-resisting material. In this case, it should be noted that it is necessary to select a material which resists a solvent for coating and is soluble in any solvent.

It is to be noted that it is preferable that the surface of the glass substrate 1 after the heat resisting high molecular material 4 is filled is a flat surface. According to need, a planarization or flattening process may be implemented. It is a matter of course that if the filling state of the heat-resisting high molecular material 4 is good, such a planarization process may be omitted.

Figure 4:
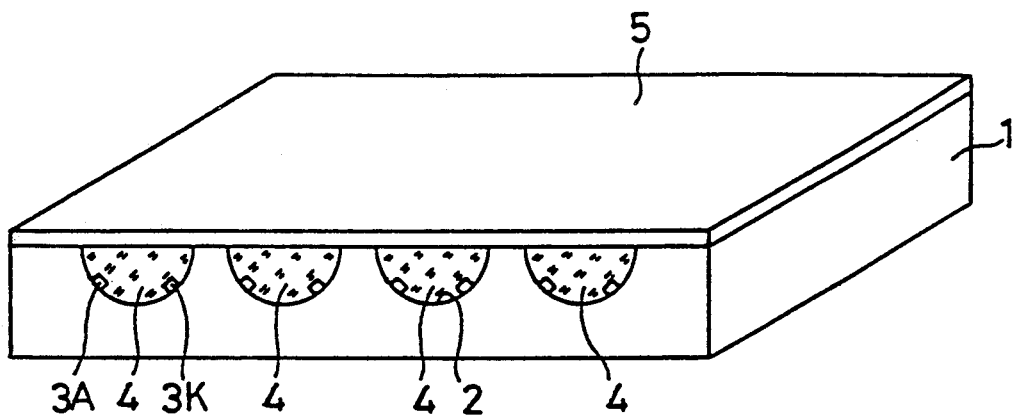
FIG. 4 is a schematic perspective view showing a dielectric film forming process.

Then, as shown in FIG. 4, a dielectric film 5 is formed on the flattened glass substrate 1.

As a material of the dielectric film 5, glass or $SiO_2$, etc. is most suitable. However, as long as a transparent dielectric material is used, any material may be adopted. Further, in the case where an image display device is of the direct viewing type or the reflection type, the dielectric film 5 is not necessarily required to be optically transparent.

As the method of forming the dielectric film 5, there are numerous vapor phase plating technologies that can be used such as vacuum deposition or sputtering, etc., or a technique such as coating or spraying, etc. By any one of these techniques, a uniform dielectric film 5 free from unevenness in the film thickness is formed. Particularly, in order to obtain a thin film thickness, the vacuum deposition or sputtering method is most suitable. In the embodiment described herein, the dielectric film preferably is formed by sputtering $SiO_2$.

It is to be noted that these techniques cannot be adopted until grooves 2 the formed at the glass substrate 1 are subjected to back filling by the heat-resisting high molecular material 4 so that they are flattened. If a dielectric film 5 is formed by the above-mentioned technologies under the state where the heat-resisting high molecular material 4 is not filled into the grooves 2, dielectric film 5 would be formed along the grooves 2.

Further, when attention is drawn to the electric coupling between the discharge region and the electro-optical material layer or the spread of charges, etc., it is preferable that film 5 be as thin as possible. Accordingly, it is preferable that the film thickness of the dielectric film 5 is 1 to 20 $\mu$m. Such a film thickness cannot be realized in the case of handling the dielectric film as a dielectric sheet of a single body, but can be realized only by adopting a method as in this embodiment.

Figure 5:
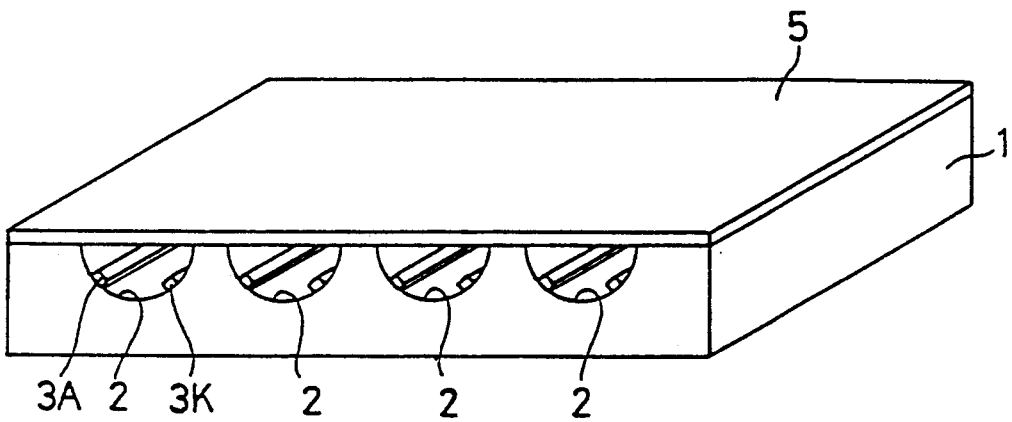
FIG. 5 is a schematic perspective view showing a heat-resisting high molecular dissolving and removing process.

Subsequently, as shown in FIG. 5, the heat-resisting high molecular material 4 filled in the grooves 2 is dissolved and removed.

For example, in the case where polyimide is used as the heat-resisting high molecular material 4, it is sufficient to use alkali solution such as KOH, etc.

Thus, there occur spaces between the grooves 2 and the dielectric film 5. These spaces serve as respective plasma chambers.

Figure 6:
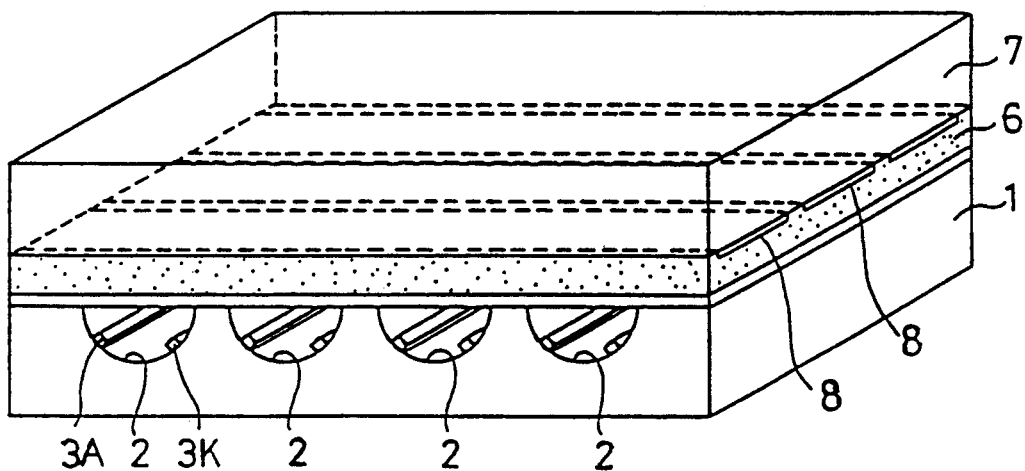
FIG. 6 is a schematic perspective view showing a process of stacking an electro-optical material layer and a transparent substrate.
Figure 7:
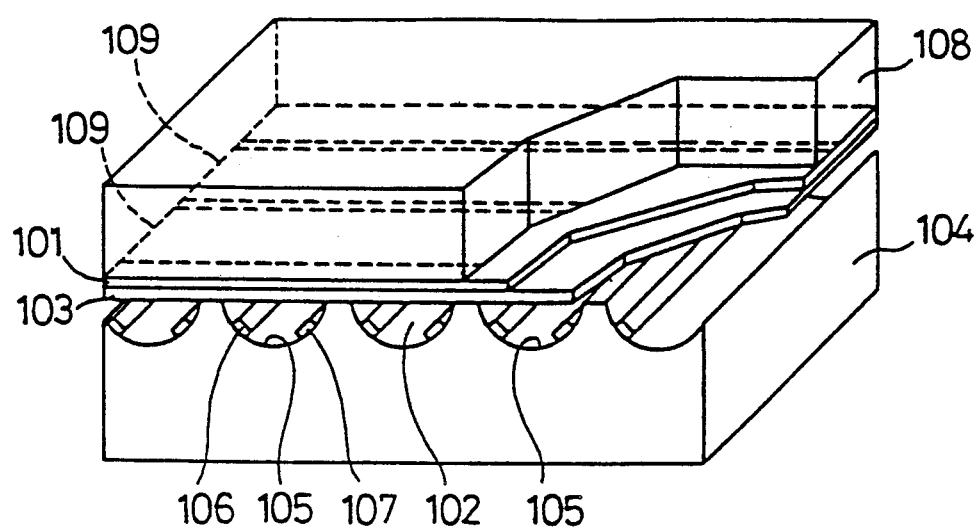
FIG. 7 is an essential part enlarged perspective view showing, in a partially broken manner, an example of the structure of a plasma addressed liquid crystal display device.

Finally, as shown in FIG. 6, an electro-optical material layer 6 and a transparent substrate 7 are stacked on the dielectric film 5. Thus, an image display device is completed.

As the electro-optical material layer 6, a liquid crystal material such as nematic liquid crystal, etc. is used. Accordingly, for example, by arranging the transparent substrate 7 through a spacer (of which indication is omitted) with a predetermined gap between the transparent substrate 7 and the dielectric film 5 to insert the electro-optical material layer 6 into the space between the transparent substrate 7 and the dielectric film 5 in a manner as in an ordinary liquid crystal cell, such an image display device is formed with ease.

Further, at the surface on the electro-optical material layer 6 side of the transparent substrate 7, grooves 2 provided on the glass substrate 1 and belt-shaped electrodes 8 perpendicular to the discharge electrodes 3 are formed. The portions where these belt-shaped electrodes 8 and the grooves 2 intersect with each other correspond to respective pixels.

In this way, an image display device is made up. In the image display device thus obtained, the film thickness of the dielectric film 5 has no unevenness and is extremely thin. Thus, a high quality or definition image can be formed.

Further, since the dielectric film 5 is directly formed on the glass substrate 1, handling thereof becomes easy, and heat processes such as frit seal, etc. also becomes unnecessary. Thus, various problems encountered with the prior art are all solved. Thus, working efficiency and/or productivity can be improved to a greater degree.

It is a matter of course that while an explanation of the invention has been given in connection with one embodiment of the invention, this embodiment is not limited to this invention.

As is clear from the foregoing description, in accordance with the producing method of this invention, since the dielectric film is directly formed on the substrate flattened by the heat-resisting high molecular material, difficulties followed by handling an extremely thin dielectric film can be eliminated.

For example, the working efficiency and/or productivity can be improved to a greater degree.

Further, since a large area and extremely thin dielectric film can be formed, it is possible to sufficiently cope with implementation of an enlarged display screen.

Furthermore, since unevenness in the film thickness of the dielectric film can be eliminated, and the film thickness of the dielectric film can be extremely thin as compared to the prior art, the characteristic of an image display device obtained can be improved to a greater degree.

In addition, it is unnecessary to seal the dielectric film by heat such as frit seal, etc., thus making it possible to eliminate crack or shrivelling, etc. of the dielectric film.

What is claimed is:

1. A method for producing an electro-optical device comprising the steps of:
   forming a plurality of channels on a major surface of a first substrate, the channels being substantially parallel to each other;
   forming a pair of first electrodes in each channel so as to provide a gas discharge space between the first electrodes of each pair;
   filling the channels with a filler material so as to flatten the major surface of the first substrate;
   depositing a dielectric layer on the flattened surface of the first substrate;
   removing the filler material from the channels;
   combining the first substrate with a second substrate, the second substrate having a plurality of second electrodes disposed substantially perpendicularly to the channels of the first substrate; and
   providing an electro-optical material layer interposed between the dielectric layer and the second substrate.

2. A method according to claim 1; wherein said channels are formed in the first substrate.

3. A method according to claim 1; wherein said channels are defined by partition walls formed on the first substrate.

4. A method for manufacturing discharge chambers comprising the steps of:
   forming a plurality of channels on a major surface of a substrate, the channels being substantially parallel to each other;
   forming a pair of first electrodes in each channel so as to provide a gas discharge between the first electrodes of each pair;
   filling the channels with a filler material so as to flatten the major surface of the substrate; depositing of a dielectric layer on the flattened surface of the substrate; removing the filler material from the channels; and filling the channels with an ionizable gas.

5. A method according to claim 4, wherein said material comprises a heat-resisting polymer.

6. The method according to claim 1, wherein said step of depositing a dielectric layer on said substrate includes a step of applying heat thereto.

7. The method according to claim 6, wherein said filler material is heat resistant and resists the heat applied to said dielectric layer.

8. The method according to claim 1, wherein said filler material is a heat-resisting high polymer.

9. The method according to claim 1, wherein said filler material comprises a plastic material.

10. The method according to claim 1, wherein said step of removing said filler material includes dissolving the filler material in the channels.

11. A method of manufacturing an electro-optical device comprising the steps of:
forming a plurality of channels on a major surface of a first substrate, each of the channels defining a gas-discharge path;
forming a pair of first electrodes in each channel between which is formed a gas discharge space;
filling the channels with a filler material so as to flatten the major surface of the first substrate;
depositing a dielectric layer on the flattened surface of the first substrate;
removing the filler material from the channels; and
combining the first substrate with a second substrate, the second substrate having a plurality of second electrodes and an electro-optical material layer disposed between the dielectric layer and the second substrate, the channels and the second electrodes being arranged so that they are spaced-apart in vertical and horizontal directions, respectively.

12. The method of claim 11, wherein each of said channels is separated by a wall of the first substrate.

13. The method of claim 11, wherein each of said channels is separated by a partition wall formed on the first substrate.

14. The method of claim 11, wherein said filler material is a heat-resisting high polymer.

15. The method of claim 11, wherein said step of removing said filler material includes dissolving the filler material filled in the channels.

16. The method of claim 11, wherein said step of depositing said dielectric layer includes a step of applying heat thereto.

17. The method of claim 16, wherein said filler material is a heat resistant material which resists the heat applied to the dielectric layer.

* * * * *